United States Patent [19]
Sakita

[11] Patent Number: 4,901,694
[45] Date of Patent: Feb. 20, 1990

[54] ROTARY ENGINE

[76] Inventor: Masami Sakita, 307 Beresford Ave., Redwood City, Calif. 94061

[21] Appl. No.: 271,231

[22] Filed: Nov. 14, 1988

[51] Int. Cl.[4] .............................................. F02B 53/00
[52] U.S. Cl. ..................................... 123/234; 418/36; 418/112; 418/142; 418/185
[58] Field of Search ............... 123/234, 236, 221, 245; 418/15, 36, 185, 112, 142

[56] References Cited

U.S. PATENT DOCUMENTS

| | | | |
|---|---|---|---|
| 2,155,249 | 4/1939 | Bancroft | 123/234 X |
| 2,413,590 | 12/1946 | Snyder | 418/36 X |
| 2,804,059 | 8/1957 | Honjyo | |
| 2,840,058 | 6/1958 | Stringer | 418/185 X |
| 3,256,866 | 6/1966 | Bauer | |
| 3,312,200 | 4/1967 | Benson | 123/234 |
| 3,327,692 | 6/1967 | Keagle | 123/43 |
| 3,396,632 | 8/1968 | LeBlanc | 91/60 |
| 3,398,643 | 8/1968 | Schudt | 91/60 |
| 3,807,368 | 4/1974 | Johnson | 123/245 |
| 4,086,882 | 5/1978 | McCrum | 123/216 |
| 4,437,441 | 3/1984 | Menioux | 123/245 X |
| 4,646,694 | 3/1987 | Fawcett | 123/245 |

FOREIGN PATENT DOCUMENTS

| | | | |
|---|---|---|---|
| 2325253 | 11/1974 | Fed. Rep. of Germany | 418/185 |
| 79623 | 5/1983 | Japan | 123/245 |
| 15623 | 6/1911 | United Kingdom | 123/234 |

OTHER PUBLICATIONS

Van Nostrand's Scientific Encyclopedia 4th Edition., D. Van Nostranc Company, Inc., 1968, pp. 1773–1775.

Primary Examiner—Michael Koczo
Attorney, Agent, or Firm—Victor R. Beckman

[57] ABSTRACT

A rotary engine includes separate compressor and combustion sections which are interconnected. Each section includes a cylinder formed with a cylindrical working chamber containing a pair of pistons rotatable about the cylinder axis. The pistons are attached by cylindrical hubs to coaxial shafts extending from an end of the cylinders, which shafts are interconnected by generally elliptical gear means to provide for rotation of the pistons at periodically variable speeds such that sub-chambers of periodically variable volume are provided. The outer free edges of the pistons and attached hubs are recessed, and seal means are located in the recesses to prevent gas leakage between opposite sub-chambers. The combustion section cylinder is provided with intake and exhaust ports in the cylinder wall and, for spark ignition, with a spark plug. For compression ignition, fuel injector means are provided in place of the spark plug. The one compressor piston attached to the inner shaft is provided with inlet passages which extend from opposite leading and trailing faces of the piston and through the associated hub to the inner shaft, at least a section of which inner shaft is tubular. Reed valve means are located in the piston passages for control of fluid into the compressor sub-chambers. Compressed air is supplied to the combustion section intake port from an outlet in the compressor section.

24 Claims, 7 Drawing Sheets

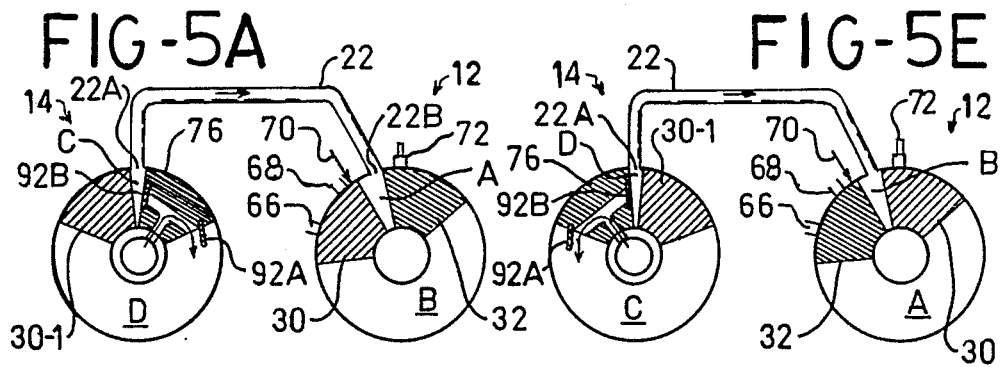
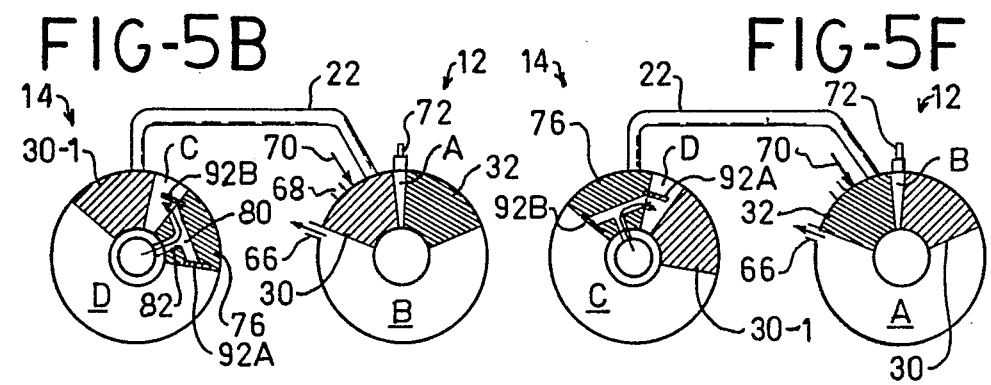
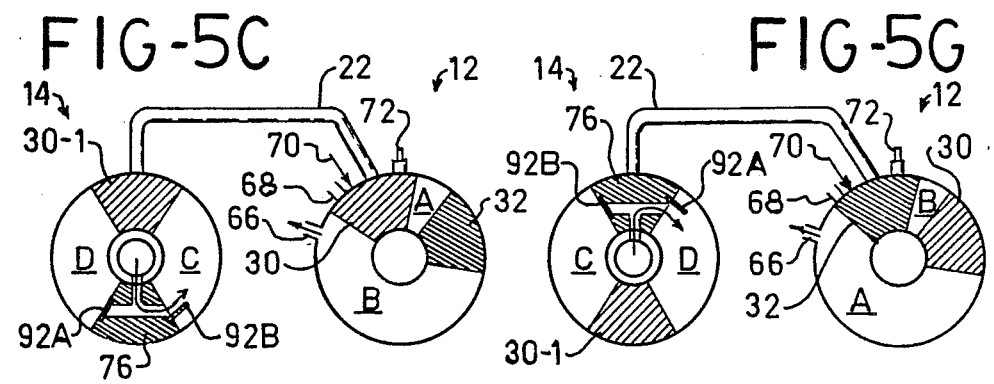
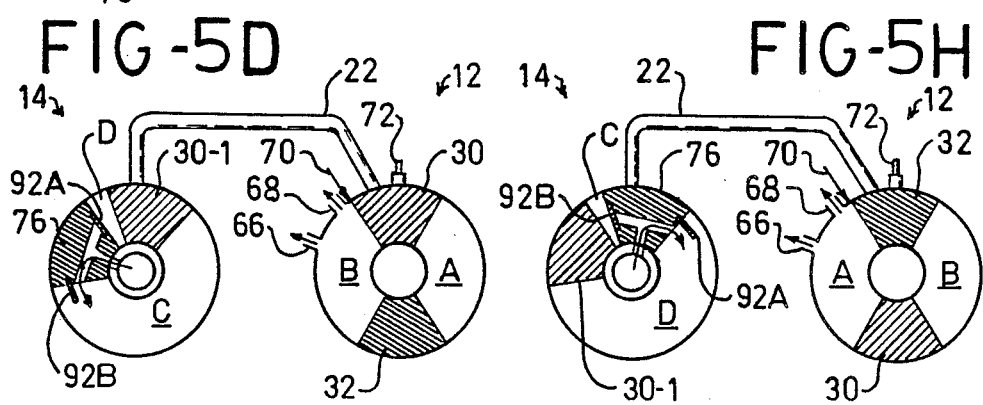

FIG-6A
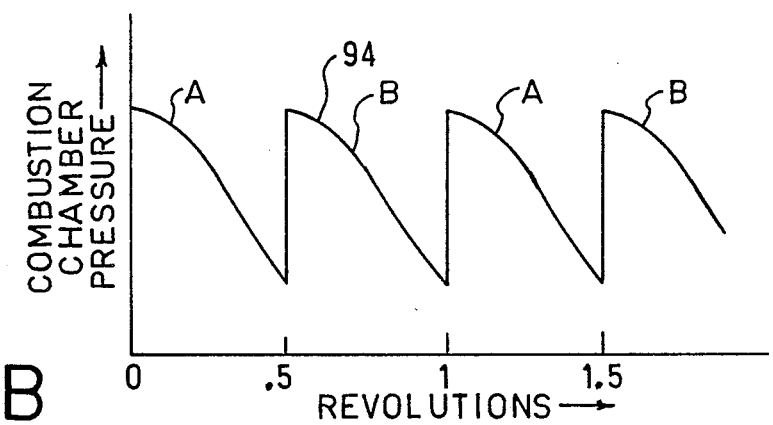
FIG-6B
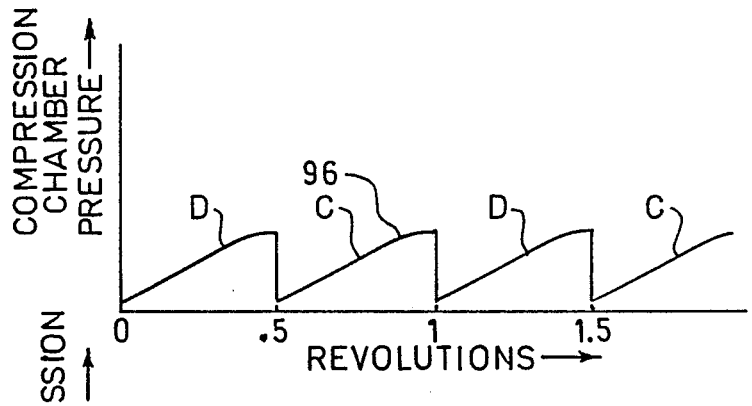
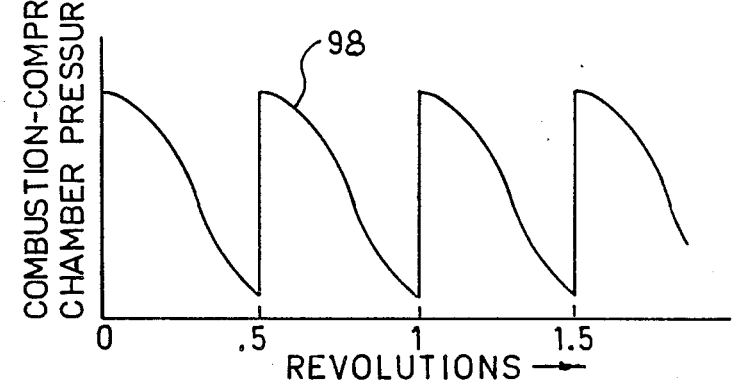
FIG-6C

ROTARY ENGINE

FIELD OF THE INVENTION

This invention relates generally to rotary engines and to a novel rotary compressor for use therewith.

BACKGROUND OF THE INVENTION

Rotary engines which include a housing formed with a cylindrical shaped chamber in which one or more pairs of pistons are located are well known. The pistons are interconnected for rotation at relatively periodically variable speeds whereby piston chambers of periodically variable volume are formed between adjacent piston faces. Engines of this type are shown, for example, in U.S. Pat. Nos. 4,646,694 - Fawcett; 3,396,632 -Leblanc; 3,256,866 - Bauer; and 2,804,059 -Honjyo. Rotary engines of this type are limited in the amount of expansion of the burning fuel which may take place before the exhaust phase of the cycle takes place.

In order to extend the expansion phase, the use of compound engines which include interconnected first and second engine sections has been suggested. Ignited combustibles from a first, or primary, engine section are supplied to a second, or secondary, engine section where they are combined with additional air to support burning of leftover combustibles. Exhaust products are exhausted from the secondary engine section. A compound engine employing such primary and secondary rotary engine sections is shown in U.S. Pat. No. 4,086,882 - McCrum. Superchargers for compressing air supplied to engines of either the Otto or Diesel type are well known as shown, for example, in Van Nostrand's Scientific Encyclopedia - 4th Edition - D. Van Nostrand Company, Inc. 1968 - pp. 1773–1775.

The work output of many rotary engines is limited by the limited amount of expansion of the burning fuel/air mixture which is possible during the power phase of the operating cycle before the exhaust phase is initiated. Also, sealing of the pistons in the cylindrical chamber is difficult with many prior art rotary engines.

SUMMARY AND OBJECTS OR THE INVENTION

An object of this invention is the provision of an improved rotary engine which avoids the above-mentioned problems of limited expansion and difficulty of sealing between the pistons and cylinder walls often encountered in prior art rotary engines.

An object of this invention is the provision of a rotary engine which operates very efficiently.

An object of this invention is the provision of an improved rotary engine which includes interconnected first and second rotary piston sections wherein air intake and compression functions are performed at the first section and combustion and exhaust functions are performed at the second section following transfer of compressed air from the first to the second section.

An object of this invention is the provision of an improved rotary engine of the above-mentioned type wherein the first and second engine sections each includes a pair of rotary pistons which rotate in the same direction at recurrently variable speeds.

The present invention includes separate intake/compressor (compressor) and combustion/exhaust (combustion) sections which are interconnected for operation of the compressor section by the combustion section. Each section includes a cylinder formed with a cylindrical working chamber containing a pair of pistons rotatable about the cylinder axis, which pistons divide each working chamber into a pair of diametrically opposite spaces, or sub-chambers. The pistons are attached by cylindrical hubs to axially aligned shafts which extend from an end of the cylinders. The shafts are interconnected through elliptical gear means which provides for rotation of the pistons at periodically variable speeds whereby sub-chambers of periodically variable volume are provided. The outer free edges of the pistons and attached hubs are recessed, and seal means are located in the recesses to form a gas sealing relation between adjacent hubs and between the pistons and cylinder wall.

The combustion section is provided with an air inlet port in the cylinder wall through which compressed air from the compressor section is supplied to the combustion section during a brief compression phase of the operating cycle of the combustion section. Fuel is injected directly into the combustion section, and ignited by use of a spark plug. Following ignition of the fuel at a point where the sub-chamber volume is substantially minimum, an extended power phase is provided, followed by an extended exhaust phase during which burned gases are exhausted through exhaust port means in the cylinder wall. Since compressed air is supplied to the contracting sub-chamber of the combustion section from the compressor section, no suction, or induction, phase is included in the operating cycle of the engine section. In the course of one complete revolution of the compressor and combustion section pistons, two complete engine operating cycles are completed; one for each of the two sub-chambers of the two sections.

In a modified form of this invention fuel is supplied to the compressor section whereby an air/fuel mixture is supplied to the combustion section from the compressor section. In this case, no separate fuel injector means at the combustion section is required. In another modified form of this invention, operation by compression ignition is provided. This embodiment includes no spark plug but instead includes high-pressure fuel injection means for injecting fuel into the hot compressed air in the combustion section when the combustion section sub-chamber volume is substantially minimum. For compression ignition, compression to a higher pressure so as to raise the compressed air temperature to the ignition temperature of the fuel is required.

In the compressor section, the one piston attached to the inner shaft is provided with passages which extend from opposite faces of the piston and through the associated hub to the inner shaft. At least a section of the inner shaft is tubular, and a radially extending passage in the shaft provides communication between the piston passages and axial bore of the tubular shaft. Valve means, such as reed valves, are located in the piston passages for control of fluid into and out of the sub-chambers of the compressor. Air is supplied to the compressor sub-chambers through the tubular inner shaft. The reed valve in the passage leading to the expanding sub-chamber is opened by the reduced pressure therein to draw fluid into the subchamber. The reed valve in the passage leading to the contracting sub-chamber is closed whereby fluid in this sub-chamber is compressed. A fluid line connects an outlet port in the compressor section to the inlet port of the combustion section for supplying compressed air to the contracting-volume sub-chamber of the combustion section.

BRIEF DESCRIPTION OF THE DRAWINGS

The invention, together with other objects and advantages thereof, will be better understood from the following description considered with the accompanying drawings. It will be understood that the illustrated embodiments of the invention included herein are by way of example only and that the invention is not limited thereto. In the drawings, wherein like reference characters refer to the same parts in the several views:

FIGS. 5A through 5H schematically illustrate a sequence of operational positions of the combustion and compressor sections of the invention;

FIGS. 6A through 6C are graphs of pressure versus rotary position of the output shaft for the combustion and compressor sections and for the combined combustion and compressor sections;

Figure 1:
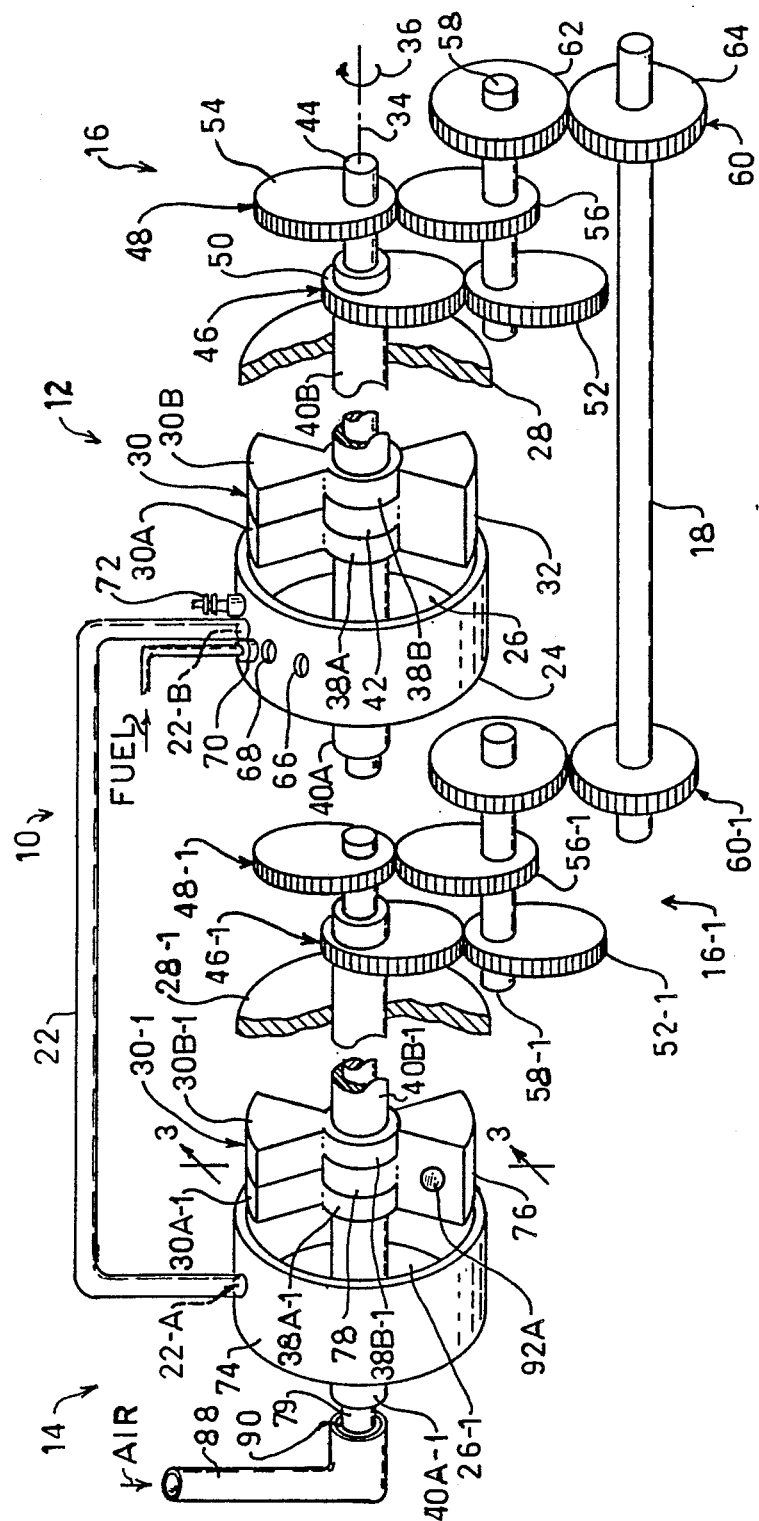
FIG. 1 is an exploded isometric view, partly in section, of a rotary engine embodying the present invention.

Reference first is made to FIG. 1 of the drawings wherein the engine 10 of this invention is shown to include an interconnected combustion/exhaust (combustion) unit, or section, 12 and intake/compressor (compressor) unit, or section, 14. Power output from the combustion section is supplied through a set of gears 16 to an output shaft 18. Output shaft 18, in turn, is connected through a set of gears 16-1 to the compressor section 14 for drive rotation thereof. Compressed air from outlet port 22A of the compressor section 14 is supplied to an intake port 22B of the combustion section 12 over an interconnecting pressure line 22.

Figure 2:
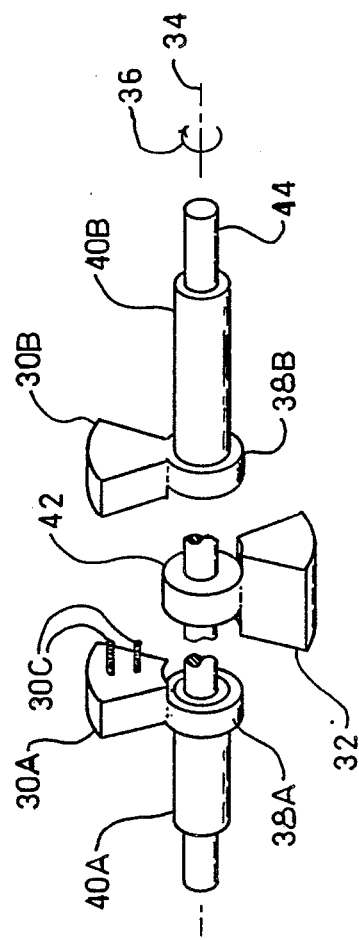
FIG. 2 is an exploded isometric view, partly in section, of the pistons included in the combustion section of the rotary engine.

The combustion section 12 includes a stationary housing 24 having a cylindrical bore which is closed at opposite ends by end plates 26 and 28 attached thereto as by bolts or other suitable means, not shown, to form a cylindrical internal combustion working chamber. The working chamber is divided into first and second diametrically opposite sub-chambers by two wedge-shaped pistons 30 and 32 located therein. To facilitate construction and assembly, one piston 30 is made of two piston sections 30A and 30B which are interconnected as by use of bolts 30C that extend through apertures in one section and threadedly engage threaded apertures in the other section, as shown in FIG. 2. The pistons are rotatable about a common axis 34 and, in operation, rotate in the same direction as indicated by arrow 36. As will become apparent, the pistons operate at periodically variable speeds such that periodically variable volume sub-chambers are provided between pistons.

Piston sections 30A and 30B are provided with integral cylindrical hubs 38A and 38B which are affixed to tubular shaft sections 40A and 40B, respectively. Piston 32 is provided with an integral cylindrical hub 42 sandwiched between hubs 38A and 38B, which hub is affixed to an inner shaft 44 rotatably mounted in the tubular shaft sections 40A and 40B. Shaft sections 40A and 40B are rotatably supported by end plates 26 and 28, respectively, through suitable bearing means, not shown.

Two sets of non-circular gears 46 and 48 interconnect the shafts 40B and 44 for control of the relative movement of pistons 30 and 32 during rotation thereof. The first gear set 46 comprises, for example, meshing eccentric elliptical gears 50 and 52, and second gear set 48 comprises meshing eccentric elliptical gears 54 and 56. Gears 50 and 54 are affixed to outer and inner shafts 40B and 44, respectively, and gears 52 and 56 are affixed to an idler shaft 58. A third set 60 of intermeshing circular gears 62 and 64 affixed to shafts 58 and 18, respectively, connects idler shaft 58 to output shaft 18. Relative movement of the pistons is dependent upon the ellipticity of the gear sets 46 and 48; the greater the ellipticity, the greater the relative movement.

Housing 24 is provided with one or more adjacent exhaust ports; two such exhaust ports 66 and 68 being shown. Next, in the direction of piston travel, a fuel injection nozzle 70 is provided which is connected to a source of fuel, through which nozzle fuel is injected into the sub-chambers following discharge of combustion products through the exhaust ports. Air line 22 is located adjacent the fuel injection nozzle 70 for the supply of compressed air to the combustion sub-chamber from compressor unit 14 following injection of engine fuel. Finally, ignition device 72, such as a spark plug, is located adjacent air line 22 for ignition of the compressed air/fuel mixture contained in the sub-chamber. As will become apparent hereinbelow, the operating cycle of the combustion unit includes no suction, or induction, phase since compressed air is supplied to the contracting-volume sub-chamber of the combustion unit.

Air compressor unit 14 is of similar design to combustion unit 12, and corresponding parts of the compressor unit are provided with the same reference character as combustion unit parts but with the addition of the suffix -1. Compressor section 14 includes a stationary compressor housing 74 having a cylindrical bore which is closed at opposite ends by end plates 26-1 and 28-1 to form a cylindrical internal compression working chamber. Housing 74 includes a single outlet port to which line 22 is connected. Wedge-shaped pistons 30-1 and 76 are located in the working chamber. The one piston 30-1 is connected to outer tubular shaft sections 40A-1 and 40B-1 through cylindrical hubs 38A-1 and 38B-1, respectively. A cylindrical hub 78, to which piston 76 is attached, connects piston 76 to inner shaft 79 which extends through tubular shaft sections 40A-1 and 40B-1, and is rotatably supported thereby.

Two sets of non-circular eccentric elliptical gears 46-1 and 48-1 interconnect the outer and inner shafts 40B-1 and 79 for control of the relative movement of pistons 30-1 and 76, respectively. Idler shaft 58-1 to which gears 52-1 and 56-1 are affixed, is coupled through circular gear set 60-1 to engine output shaft 18. By including a second gear set 16-1 in the connection of the engine section shafts 40B and 44 to the compressor section shafts 40B-1 and 79 the relative phase of the combustion and compressor section pistons is readily adjustable.

Figure 4:
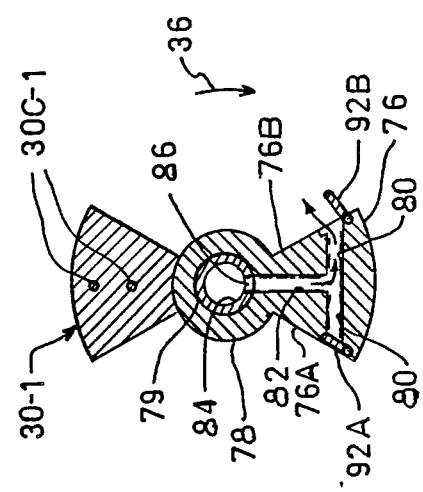
FIG. 4 is a transverse sectional view taken along line 4—4 of FIG. 3.
Figure 3:
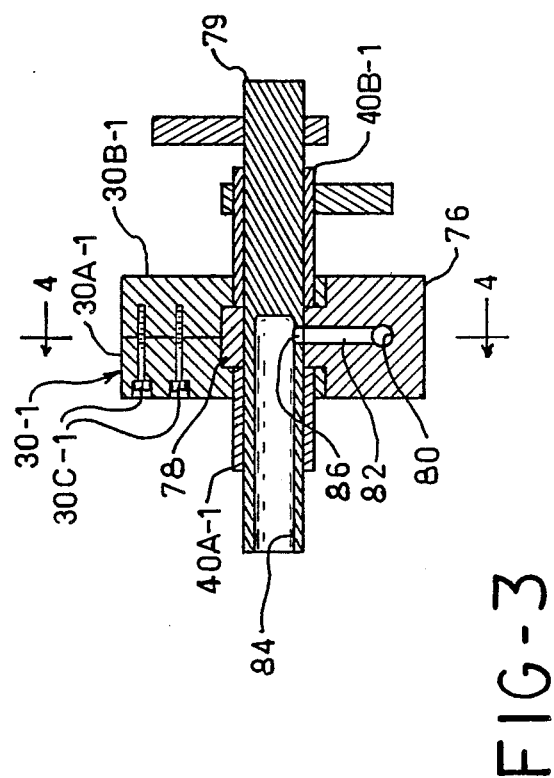
FIG. 3 is a longitudinal sectional view taken along line 3—3 of FIG. 1.

Reference now is made to FIGS. 3 and 4 wherein the one piston 76 of compressor section 14 is shown to include apertures 80 in the leading and trailing faces 76A and 76B thereof, which apertures communicate with a radial passage 82 extending through hub 78. An end section of shaft 79 to which piston 76 is affixed is provided with an axial bore 84 and radial passage 86 which communicate with radial passage 82 in piston 76. As seen in FIG. 1, an intake tube 88 may be rotatably connected through a bearing 90 to the tubular end section of shaft 79 to provide a stationary air inlet for the compressor. Reed valve means 92A and 92B are located adjacent the outer ends of passages 80 adjacent the respective leading and trailing faces 76A and 76B of piston 76. During contraction of the sub-chamber adjacent leading face 76A, reed valve means 92A is closed by increased pressure within this chamber. Simultaneously, the sub-chamber associated with trailing face 76B is expanding whereby a subatmospheric pressure is developed therein for the opening of reed valve means 92B by atmospheric pressure at air inlet passage 80 whereupon air at atmospheric pressure is drawn into the expanding sub-chamber.

Operation of the novel engine of this invention will be better understood from the sequence of operational phases schematically illustrated in FIGS. 5A–5H, to which figures reference now is made. There, operation with fuel injection and spark plug ignition is illustrated. In FIG. 5A, compressed air from compressor section 14 is transferred over line 22 to sub-chamber A of combustion section 12. Immediately prior to reaching the relative rotary piston positions illustrated in FIG. 5A, fuel is sprayed into sub-chamber A through fuel injection nozzle 70. Such fuel injection takes place immediately after exhaust port 68 is closed by piston 30. At the FIG. 5A position of the compressor pistons, reed valve means 92B is closed and compressor chamber C is at a minimum volume, maximum pressure, condition. From FIG. 5A it will be apparent that fuel and compressed air are supplied to the contracting-volume combustion unit sub-chamber, here sub-chamber A, which eliminates the requirement for a suction phase in the operating cycle of the combustion section.

In travelling from the FIG. 5A to the FIG. 5B piston positions, a small amount of compression of the fuel/air mixture in the combustion section takes place; with maximum compression occurring at the FIG. 5B position thereof. However, it will be noted that substantially all compression takes place at the compressor unit, and only a small, minor, amount of compression takes place at the combustion unit. This incidental compression at the combustion unit results from the fact that the sub-chamber into which compressed air is introduced from the compressor unit must be closed for a short period during transfer of compressed air thereto immediately prior to ignition. In the illustrated system, it will be seen that the compression phase of the combustion unit extends over substantially less than 90° relative rotation of combustion pistons 30 and 32, whereas the compression phase of the compressor unit extends over substantially more than 180° relative rotation of the compressor pistons 30-1 and 76. For the illustrated engine cycle operation it will be apparent that compressed air supplied to the combustion section from the compression section is at a temperature less than the ignition temperature of the injected fuel. Also, it will be understood that the temperature to which the compressed air/fuel mixture is raised by any small additional compression within the combustion section also is less than the ignition temperature of the fuel. At FIG. 5B, spark plug 72 is energized to ignite the compressed fuel/air mixture in sub-chamber A. As seen in FIG. 5B, sub-chamber B is exposed to the atmosphere through exhaust port 66 for simultaneous exhaustion of burnt gases from sub-chamber B. In the FIG. 5B position of the compressor pistons, reed valve means 92B leading to the expanding volume sub-chamber C is open for admission of fresh air thereto through passageways 82 and 80, and reed valve means 92A leading to the contracting volume sub-chamber D is closed for compression of air in sub-chamber D.

It here will be noted that the timing of compressor and combustion units is such that the compressor section pistons lead the combustion section pistons. For example, in FIG. 5A, sub-chamber C of the compressor section is at minimum volume, maximum pressure, whereas sub-chamber A of the combustion section does not reach minimum volume until rotation into the FIG. 5B position. During the period shown by FIGS. 5A–5E, sub-chamber C of compressor section 14 expands and sub-chamber D contracts. During this period, air is drawn into the expanding sub-chamber C, and air in contracting sub-chamber D is being compressed. During the time period covered by FIGS. 5B–5F, sub-chamber A of combustion section 12 expands and sub-chamber B contracts.

At the FIG. 5D position, both exhaust ports 66 and 68 are uncovered for exhaustion of burnt gases from both ports. Upon further rotation, when exhaust port 68 is closed by piston 32 but prior to closing off of nozzle 70 by the piston, fuel is injected into sub-chamber B. This operation takes place between the piston positions illustrated in FIGS. 5D and 5E. In the FIG. 5E position, compressed air is fed into sub-chamber B of combustion unit 12 from sub-chamber D of compressor unit 14, and in the FIG. 5F position, the air/fuel mixture is ignited by energization of spark plug 72. It will be noted that the piston positions illustrated in FIGS. 5E–5H correspond to those illustrated in FIGS. 5A–5D except for reversal in position of the pistons.

An examination of FIGS. 5A–5H shows that the power phase of the combustion section pistons proceeds from ignition of fuel in sub-chamber A at the FIG. 5B position to a point immediately prior to the FIG. 5F position when sub-chamber A is first exposed to exhaust port 66. Expansion of sub-chamber A to approximately one half the total working chamber volume is provided with this novel arrangement. In the illustrated system, it will be seen that both the combustion pistons 30 and 32 are relatively rotatable over 180° for each power phase and each exhaust phase of the combustion unit operating cycle. As described above, the sub-chamber B expands in the same amount during the next one-half cycle of operation. In the course of one complete revolution of the pistons, two power phases take place, and output shaft 18 is rotated one revolution.

In FIGS. 6A–6C, to which figures reference now is made, combustion chamber pressure, compression chamber pressure and combustion less compression chamber pressure versus revolutions of output shaft 18 are depicted, which pressure curves are identified by reference characters 94, 96 and 98, respectively. Sub-chambers primarily responsible for the combustion and compression chamber pressures shown by curves 94 and 96 in FIGS. 6A and 6B are identified on the curves as A and B, and C and D, respectively. The FIG. 6C curve 98 simply shows the pressure difference that results from the subtraction of the FIG. 6B compression chamber pressure curve 96 from the combustion chamber pressure curve 94 of FIG. 6A. As described above, for each complete revolution of the output shaft, the combustion and compressor units execute two cycles of operation.

Figure 7:
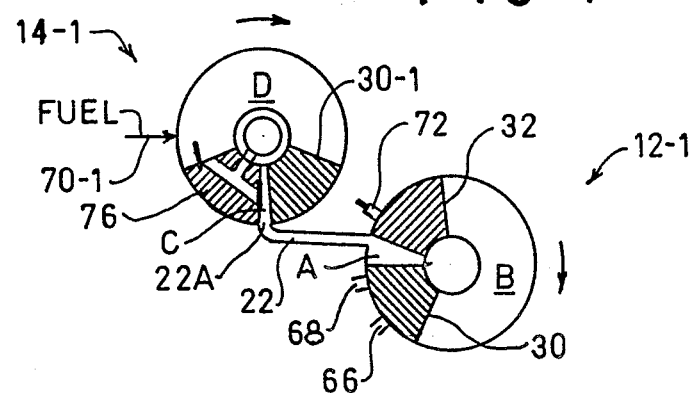
FIG. 7 is a schematic view which is similar to FIG. 5A but showing a system where fuel is injected into the compressor section whereby a compressed air/fuel mixture is supplied to the combustion section from the compressor section.

Reference now is made to FIG. 7 wherein a modified form of this invention is shown comprising a combustion section 12-1 and compressor section 14-1. The combustion section pistons 30 and 32 and compressor section pistons 30-1 and 76 are of the same type shown in FIGS. 1-4 and described above. Also, the combustion and compressor pistons are shown in the same relative positions as depicted in FIG. 5A. However, compressor section 14-1 is shown rotated about its axis 180° so that outlet port 22A is located at the bottom of the compressor rather than at the top thereof, and combustion section 12-1 is located at a lower level than the compressor section 14-1 so that air supply line 22 extending between the sections is inclined downwardly. Combustion section 12-1 also is shown rotated about its axis such that spark plug 72 extends generally sidewardly rather than vertically. The compression section is rotatably driven by the combustion section in a manner such as shown in FIG. 1 and described above. Obviously, in any of the embodiments, the elliptical gears for interconnection of the combustion and compressor sections may be located at either end of the sections, as desired, to provide for a compact engine arrangement.

The compressor cylinder is provided with a fuel injector 70-1 whereby fuel from a fuel source, not shown, may be injected into the contracting -volume sub-chamber of the air compressor section. Preferably, but not necessarily, fuel is injected into the compressor sub-chamber near the beginning of the compression phase while air pressure is still relatively low to avoid the need for a high pressure injector. The compressed air/fuel mixture is transferred through conduit 22 to the contracting-volume sub-chamber of the combustion section 12-1. In the piston positions illustrated in FIG. 7, the compressed air/fuel mixture is transferred from sub-chamber C of the compressor section to sub-chamber A of the combustion section. Upon small additional rotation of the engine pistons in a clockwise direction, sub-chamber A reaches the minimum volume condition adjacent spark plug 72 which then is energized for ignition of the compressed air/fuel mixture. As with the arrangement shown in FIGS. 1-4, compression of the air/fuel mixture is insufficient to heat the mixture to the ignition temperature thereof.

Figure 8:
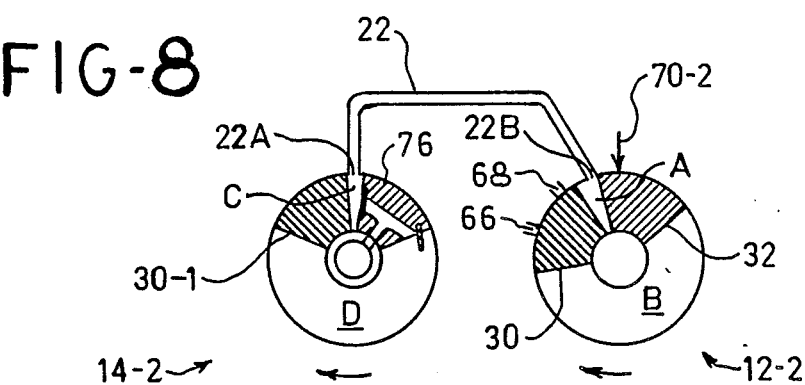
FIG. 8 is a schematic view which is similar to FIG. 5A but showing a compression ignition system.

Operation of the novel engine using compression ignition also is contemplated, and reference now is made to FIG. 8 wherein an engine employing compression ignition is shown. The compressor section 14-2 is of the same type as shown in FIG. 1, but compression is carried to a higher pressure as by a reduction in sub-chamber volume of the compressor section when the pistons are nearest together. Only air is supplied to the compressor; not an air/fuel mixture. The combustion section, identified by reference character 12-2 includes no spark plug. Also, a high pressure fuel injector 70-2 is located at a point that the spark plug in the sparkignition combustion section was located. When sub-chamber A reaches maximum pressure, minimum volume, fuel from fuel injector 70-2 is sprayed into sub-chamber A, which fuel is compression ignited by the high temperature of the compressed air in chamber A. Another power phase is provided by sub-chamber B one half cycle later.

Figure 9:
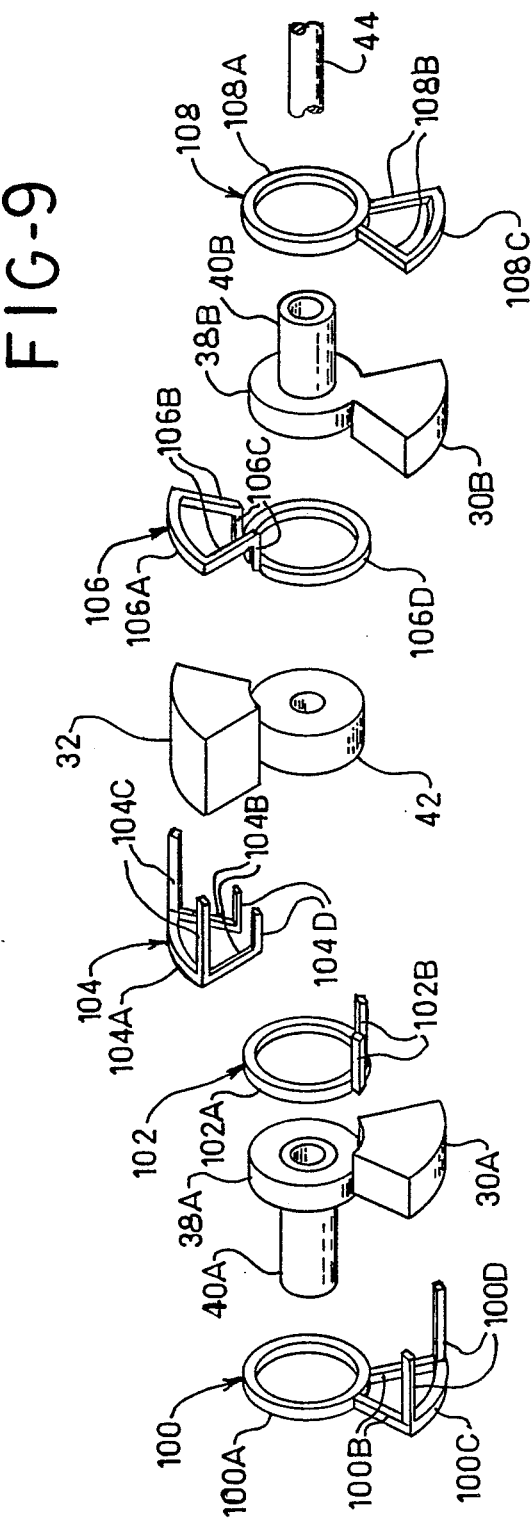
FIG. 9 is an exploded isometric view showing sealing means in accordance with this invention.
Figure 10:
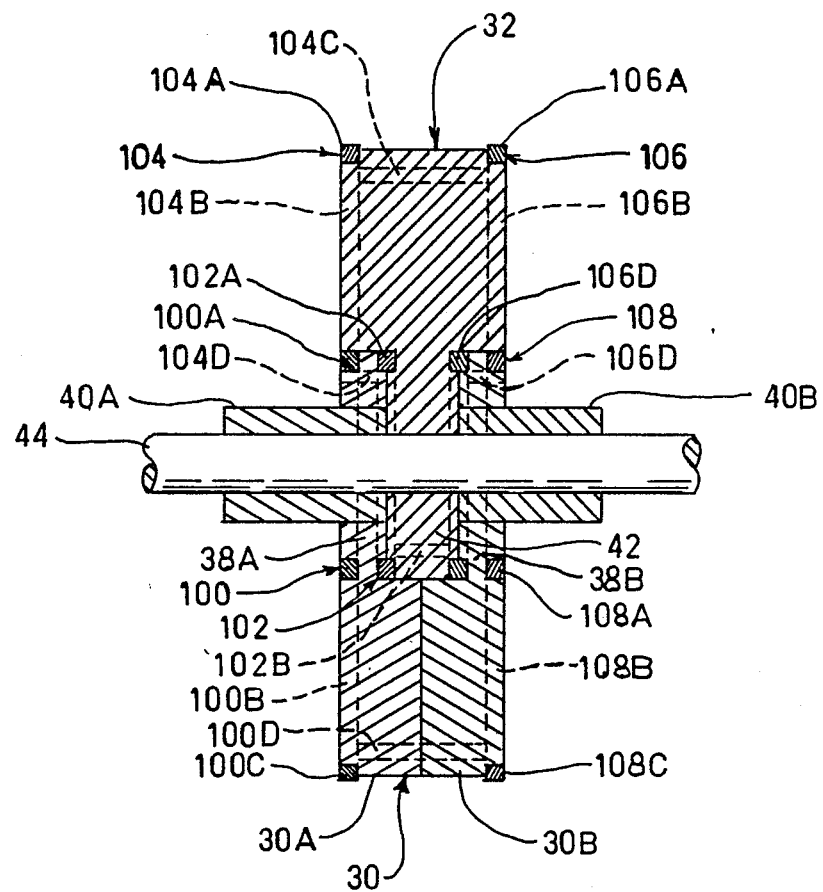
FIG. 10 is a cross sectional view of pistons with associated sealing means of the type shown in FIG. 9.

With the present invention, sealing of the combustion and compressor sub-chambers to prevent the flow of gases between sub-chambers A and B of the combustion section, and sub-chambers C and D of the compressor section, is easily facilitated. In FIGS. 9 and 10 of the drawings, to which reference now is made, sealing means for the combustion section pistons are shown. Similar sealing means, not shown, are employed in the compressor section. In accordance with the present invention, free edges of the pistons and associated cylindrical hubs are recessed to accommodate the sealing means. For simplicity, recesses are shown in the cross-sectional view of FIG. 10, but not in the exploded isometric view of FIG. 9.

Seal means 100, 102, 104, 106 and 108 are shown in FIGS. 9 and 10. Seal means 100 includes an annular section 100A, a pair of generally radially extending leg sections 100B, an arcuate section 100C interconnecting the outer ends of legs 100B, and axially extending arms 100D. Annular seal section 100A is located in a recess formed in the edge of the outer face of cylindrical hub 38A; leg sections 100B are located in recesses extending along edges between the left side face (as viewed in FIGS. 9 and 10) and the leading and trailing faces of piston 30; arcuate section 100C is located in an arcuate recess at the edge between the left side face and outer arcuate face of piston 30; and arms 100D are located in recesses formed along edges between the outer arcuate face of piston 30 and the leading and trailing piston faces thereof.

Seal means 102 includes an annular section 102A located in opposing annular recesses formed in the edge of the right face of hub 38A and edge of the left face of hub 42. Axially extending arms 102B are located in recesses extend along edges between the inner arcuate face of piston 30 and the trailing and leading faces of piston 30. Seal means 104 includes an arcuate section 104A located in a recess at the edge between the left side and outer arcuate face of piston 32. Radial legs 104B of seal means 104 are positioned in generally radially extending recesses formed along edges between the left side face and the leading and trailing faces of piston 32. Axial legs 104C of seal means 104 are located in recesses formed along edges between the outer arcuate face of piston 32 and the leading and trailing piston faces thereof. Shorter axially extending legs 104D are located in recesses extend along edges between the inner arcuate face and the trailing and leading faces of piston 32 at the left side thereof.

Seal means 106 includes: an arcuate section 106A which is located in an arcuate recess at the edge between the right side and outer arcuate faces of piston 32; a pair of generally radially extending leg sections 106B which are positioned in recesses formed along edges between the right side face and the leading and trailing faces of piston 32; axially extending legs 106C located in recesses extending along edges between the inner arcuate face and the trailing and leading faces of piston 32 at the right side thereof; and, an annular section 106D located in opposing annular recesses formed in the edge of the right face of cylindrical hub 42 and edge of the left face of cylindrical hub 38B. Finally, seal means 108 includes: an annular section 108A located in a recess formed in the edge of the outer face of cylindrical hub 38B; generally radially extending leg sections 108B located in recesses extending along edges between the right side face and leading and trailing faces of piston 30; and, an arcuate section 108C located in an arcuate recess at the edge between the right side face and outer arcuate face of piston 30. Outer ends of legs 100D may be attached to the outer ends of arms 108B in the assembled condition and, similarly, the outer ends of arms 104C may be secured to the outer ends of arms 106B. With this novel arrangement of seal means, not only are the sub-chambers sealed from each other, but the sealing is simple to implement.

The invention having been described in detail in accordance with requirements of the Patent Statutes, various other changes and modifications will suggest themselves to those skilled in this art. For example, the arcuate length of the wedge-shaped pistons may be changed without departing from the invention. Also, the trailing, and/or leading, faces of the pistons may be formed with a depression, or cavity, so as to reduce the compression ratio provided by the relative rotational movement of the pistons. As noted above, the ellipticity of the gear sets used to interconnect the pistons also affects the compression ratio, as does the arcuate length of the pistons. The proper compression ratio for either spark ignition or compressions ignition operation is easily provided by those skilled in the art. Also, the compressor section shafts may be connected to the engine section shafts through other means than gear sets 46-1, 48-1 and 60-1, if desired. For example, direct connection of the axially aligned combustion and compressor section shafts may be provided. Additionally, it will be apparent that additional combustion and compression sections may be included which are phased differently to provide for a smooth running multichamber engine. Furthermore, one way clutch means may be provided to limit rotation of the pistons in one rotary direction. If desired, the FIG. 7 embodiment may be modified to provide for the supply of fuel to compressor 14-1 at the air inlet thereto rather than by use of fuel injection nozzle 70-1. Obviously inlet and outlet ports may be provided at appropriate locations on the cylinder end walls (such as walls 26 and 28) instead of on the cylindrical wall 24, if desired. It is intended that the above and other such changes and modifications shall fall within the spirit and scope of the invention as defined in the appended claims.

I claim:

1. In an internal combustion engine the combination comprising,
    a combustion unit comprising means forming a cylindrical combustion working chamber having inlet and exhaust port means,
    two pistons within the working chamber which are interconnected by eccentric elliptical gear means for rotation in the same direction at recurrently variable speeds whereby two combustion sub-chambers of recurrently variable volume are provided wherein one combustion sub-chamber decreases in volume while the other increases in volume, said two pistons comprising the only pistons within the working chamber,
    for each complete revolution of the pistons two combustion unit operating cycles being completed, each combustion unit operating cycle including successive power, exhaust, and compression phases without a suction phase, relative piston travel during each said power and exhaust phase being greater than relative piston travel during each said compression phase,
    a compressor unit driven by said combustion unit for supplying compressed air to the decreasing-volume combustion sub-chamber during each compression phase, and
    means for supplying fuel to the combustion sub-chambers which, when ignited, initiates the power phase for rotation of said pistons.

2. In an internal combustion engine as defined in claim 1 wherein said compressor unit comprises
    means forming a cylindrical compressor working chamber having inlet means and outlet port means,
    two pistons within the compressor working chamber driven by said combustion unit for rotation thereof in the same direction at recurrently variable speeds whereby two compressor sub-chambers of recurrent variable volume are provided wherein one compressor sub-chamber decreases in volume while the other increases in volume, said two compressor pistons comprising the only two pistons in the compressor working chamber, and
    means for connecting the compressor outlet port means to the inlet of said combustion unit for recurrent transfer of compressed air from the compressor unit to the combustion unit.

3. In an internal combustion engine as defined in claim 1 including a spark plug located at a point where combustion sub-chamber volume is substantially minimum for igniting fuel within the combustion sub-chambers.

4. In an internal combustion engine as defined in claim 3 wherein said means for supplying fuel to the combustion sub-chambers includes fuel injection nozzle means located intermediate said inlet and exhaust port means for injecting fuel into the decreasing-volume combustion sub-chamber following the exhaust phase.

5. In an internal combustion engine as defined in claim 1 wherein said means for supplying fuel to the combustion sub-chambers includes means for introducing fuel into said air compressor unit for entry into said combustion sub-chambers with compressed air from said air compressor unit.

6. In an internal combustion engine as defined in claim 1 wherein said two pistons are relatively rotatable at least 180°, and each said power and exhaust phase extends over at least 180° relative rotation of said two pistons.

7. A rotary internal combustion engine comprising,
    separate combustion and compressor sections,
    said combustion section comprising a combustion cylinder housing formed with a cylindrical combustion working chamber having inlet and exhaust port means for gases,
    two generally wedge shaped combustion pistons in said combustion working chamber rotatable about the combustion cylinder axis and dividing the chamber into a pair of diametrically opposed combustion sub-chambers, said two combustion pistons comprising the only pistons within the combustion working chamber,
    means for attaching said combustion pistons to separate axially aligned shafts which are interconnected by eccentric elliptical gear means so that upon rotation said pistons rotate in the same direction at recurrently variable speeds whereby combustion sub-chambers of recurrently variable volume are provided, said compressor section comprising a compressor cylinder housing formed with a cylindrical compressor working chamber having air inlet and air outlet means, two generally wedge shaped pistons in said compressor working chamber rotatable about the compressor cylinder axis and dividing the chamber into a pair of diametrically opposed compressor sub-chambers, said two compressor pistons comprising the only pistons within the compressor working chamber, means for connecting the compressor pistons to said axially aligned shafts for drive rotation of the compressor pistons by the combustion pistons, means for connecting the compressor section outlet means to the combustion section inlet port for supplying compressed air to the decreasing-volume combustion sub-chambers from the compressor sub-chambers, and means for supplying fuel to the combustion sub-chambers which when ignited initiates a power phase for rotation of the combustion pistons.

8. A rotary internal combustion engine as defined in claim 7 including means for igniting said fuel in the combustion sub-chambers to initiate the power phase.

9. A rotary internal combustion engine as defined in claim 8 wherein said igniting means includes a spark plug located at a point where combustion sub-chamber volume is substantially minimum.

10. A rotary internal combustion engine as defined in claim 9 wherein said means for supplying fuel to said combustion sub-chambers includes fuel injection nozzle means angularly located between said combustion cylinder inlet and exhaust port means for injecting fuel into the decreasing-volume combustion sub-chamber following the exhaust phase.

11. A rotary internal combustion engine as defined in claim 7 wherein said means for supplying fuel to said combustion sub-chambers includes means for introducing fuel into said air compressor section for entry into said combustion sub-chambers with compressed air from the air compressor section.

12. A rotary internal combustion engine as defined in claim 7 wherein said means for supplying fuel to said combustion sub-chambers includes fuel injection nozzle means located at a point where combustion sub-chamber volume is substantially minimum, the temperature of compressed air in the minimum volume combustion sub-chamber being above the ignition temperature of the fuel for compression ignition of fuel injected therein.

13. A rotary internal combustion engine as defined in claim 7 wherein outer edges of said compressor and combustion pistons are recessed, and seal means at said recessed edges to prevent fluid leakage between opposed sub-chambers.

14. A rotary internal combustion engine as defined in claim 7 wherein said air compressor section includes, hub means for attaching said compressor pistons to separate coaxial compressor shafts, at least a portion of the inner coaxial compressor shaft being tubular and serving as said air inlet to the air compressor section, air inlet passages formed in the compressor piston and associated hub means attached to the inner compressor shaft to provide communication between the tubular air inlet shaft and the first and second compressor sub-chambers, and reed valve means in the air inlet passages leading to said first and second compressor sub-chambers and adapted to open when the associated compressor sub-chamber is expanding and to close when the associated compressor sub-chamber is contracting for drawing air into the expanding sub-chamber and compressing air in the contracting sub-chamber.

15. A rotary internal combustion engine as defined in claim 14 wherein said means for supplying fuel to said combustion sub-chambers includes said air inlet to the air compressor section.

16. A rotary internal combustion engine as defined in claim 14 wherein said means for supplying fuel to said combustion sub-chambers includes fuel injection means for injecting fuel into the compressor working chamber.

17. A rotary internal combustion engine as defined in claim 16 wherein said compressor cylinder housing is positioned at a higher level than the combustion cylinder hosing, and the compressor outlet means is located adjacent the bottom of the cylindrical compressor working chamber of the housing.

18. A rotary internal combustion engine as defined in claim 7 wherein said exhaust port means includes a plurality of exhaust ports arcuately spaced along the combustion cylinder housing, the arcuate length of said combustion pistons being greater than the arcuate spacing between exhaust ports such that all exhaust ports are simultaneously closed by the combustion pistons during travel of the combustion pistons past said exhaust port means.

19. A rotary internal combustion engine as defined in claim 7 wherein said two combustion pistons are relatively rotatable at least 180°, for each complete revolution of the combustion pistons two combustion section operating cycles being completed, each combustion section operating cycle including power and exhaust phases each of which phases extends over at least 180° relative rotation of said two combustion pistons and a compression phase which extends over less than 90° relative rotation of said two combustion pistons.

20. A rotary internal combustion engine comprising, separate combustion and compressor sections, said combustion section comprising a combustion cylinder housing formed with a cylindrical combustion working chamber having inlet and exhaust port means for gases, two generally wedge shaped combustion pistons in said combustion working chamber rotatable about the combustion cylinder axis and dividing the chamber into a pair of diametrically opposed combustion sub-chambers, means for attaching said combustion pistons to separate axially aligned shafts which are interconnected so that upon rotation said pistons rotate in the same direction at recurrently variable speeds whereby combustion sub-chambers of recurrently variable volume are provided, said compressor section comprising a compressor cylinder housing formed with a cylindrical compressor working chamber having air inlet and air outlet means, two generally wedge shaped pistons in said compressor working chamber rotatable about the compressor cylinder axis and dividing the chamber into a pair of diametrically opposed compressor sub-chambers, hub means for attaching said compressor pistons to separate coaxial compressor shafts, at least a portion of the inner coaxial compressor shaft being tubular and serving as said air inlet to the air compressor section, air inlet passages formed in the compressor piston and associated hub means attached to the inner compressor shaft to provide communication between the tubular air inlet shaft and the first and second compressor sub-chambers, reed valve means in the air inlet passages leading to said first and second compressor sub-chambers and adapted to open when the associated compressor sub-chamber is expanding and to close when the associated compressor sub-chamber is contracting for drawing air into the expanding sub-chamber and compressing air in the contracting sub-chamber, means for connecting the compressor pistons to said axially aligned shafts for drive rotation of the compressor pistons by the combustion pistons, means for connecting the compressor section outlet means to the combustion section inlet port for supplying compressed air to the combustion sub-chambers from the compressor sub-chambers while the combustion sub-chamber volume is decreasing, means for supplying fuel to the combustion sub-chambers which when ignited initiates a power phase for rotation of the combustion pistons, a first idler shaft, a first eccentric elliptical gear set for connecting one shaft of the combustion section to said first idler shaft, a second eccentric elliptical gear set for connecting the other shaft of the combustion section to said first idler shaft, an output shaft, means for connecting said first idler shaft to said output shaft for drive rotation of the output shaft, a second idler shaft, a third eccentric elliptical gear set for connecting one shaft of the compressor section to said second idler shaft, a fourth eccentric elliptical gear set for connecting the other shaft of the compressor section to said second idler shaft, and means for connecting said output shaft to said second idler shaft for drive rotation of the second idler shaft.

21. A rotary internal combustion engine as defined in claim 20 wherein the compressor pistons lead the combustion pistons whereby minimum compressor sub-chamber volume condition occurs prior to minimum combustion sub-chamber volume condition of the engine.

22. A rotary internal combustion engine comprising, separate combustion and compressor sections, said combustion section comprising a combustion cylinder housing formed with a cylindrical combustion working chamber having inlet and exhaust port means for gases, two generally wedge shaped combustion pistons in said combustion working chamber rotatable about the combustion cylinder axis and dividing the chamber into a pair of diametrically opposed combustion sub-chambers, means for attaching said combustion pistons to separate axially aligned combustion section shafts, a first idler shaft, a first eccentric elliptical gear set for connecting one shaft of the combustion section to said first idler shaft, a second eccentric elliptical gear set for connecting the other shaft of the combustion section to said first idler shaft, an output shaft, means for connecting said first idler shaft to said output shaft for drive rotation of the output shaft, said compressor section comprising a compressor cylinder housing formed with a cylindrical compressor working chamber having air inlet and air outlet means, two generally wedge shaped pistons in said compressor working chamber rotatable about the compressor cylinder axis and dividing the chamber into a pair of diametrically opposed compressor sub-chambers, means for attaching said compressor pistons to separate axially aligned compressor section shafts, a second idler shaft, a third eccentric elliptical gear set for connecting one shaft of the compressor section to said second idler shaft, a fourth eccentric elliptical gear set for connecting the other shaft of the compressor section to said second idler shaft, means for connecting said output shaft to said second idler shaft for drive rotation of the second idler shaft, means for connecting the compressor section outlet means to the combustion section inlet port for supplying compressed air to the combustion sub-chambers from the compressor sub-chambers, and means for supplying fuel to the combustion sub-chambers which when ignited initiates a power phase for rotation of the combustion pistons.

23. A rotary internal combustion engine comprising, separate combustion and compressor sections, said combustion section comprising a combustion cylinder housing formed with a cylindrical combustion working chamber having inlet and exhaust port means for gases, two combustion pistons within the combustion working chamber rotatable about the combustion cylinder axis and dividing the chamber into a pair of diametrically opposed sub-chambers, said two combustion pistons comprising the only pistons within the combustion working chamber, first and second axially aligned shafts to which said combustion pistons are separately attached, gear means including a plurality of eccentric elliptical gear sets for interconnecting said first and second shafts for rotation of the two combustion pistons at recurrently variable speeds whereby combustion sub-chambers of recurrently variable volume are provided, said compressor section comprising a compressor cylinder housing formed with a cylindrical compressor working chamber having air inlet and air outlet means, two compressor pistons within the compressor working chamber rotatable about the compressor cylinder axis and dividing the compressor chamber into a pair of diametrically opposed sub-chambers, said two compressor pistons comprising the only pistons within the compressor working chamber, means for connecting the compressor pistons to said first and second axially aligned shafts for drive rotation of the compressor pistons by the combustion pistons at recurrently variable speeds whereby compression sub-chambers of recurrently variable volume are provided, means for connecting the compressor section outlet means to the combustion section inlet port for supplying compressed air to the combustion sub-chambers from the compressor sub-chambers while the combustion sub-chambers are decreasing in volume, and means for supplying fuel to the combustion sub-chambers which when ignited initiates a power phase for rotation of the combustion pistons.

24. A rotary internal combustion engine as defined in claim 23 including first and second hubs for attaching said first and second shafts to said combustion pistons, third and fourth axially aligned shafts for separate support of said compression pistons, third and fourth hubs for attaching said third and fourth shafts to said compressor pistions, said third and fourth shafts including coaxial portions, at least a portion of the inner shaft of the third and fourth shafts being tubular and serving as said air inlet to said air compressor section, air inlet passages formed in the compressor piston and associated hub means attached to the inner compressor shaft to provide communication between the tubular air inlet shaft and the two compressor sub-chambers, and valve means in the air inlet passages leading to said two compressor sub-chambers and adapted to open when the associated compressor sub-chamber is expanding and to close when the associated compressor sub-chamber is contracting for drawing air into the expanding compressor sub-chamber and compressing air in the contracting compressor sub-chamber.

* * * * *